(12) United States Patent
Ono

(10) Patent No.: US 9,156,512 B2
(45) Date of Patent: Oct. 13, 2015

(54) SPROCKET COVER IN STRADDLE VEHICLE

(71) Applicant: Kawasaki Jukogyo Kabushiki Kaisha, Kobe-shi, Hyogo (JP)

(72) Inventor: Takahiro Ono, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 20 days.

(21) Appl. No.: 13/917,593

(22) Filed: Jun. 13, 2013

(65) Prior Publication Data

US 2013/0337955 A1    Dec. 19, 2013

(30) Foreign Application Priority Data

Jun. 14, 2012   (JP) .................... 2012-134611

(51) Int. Cl.
| | |
|---|---|
| *B62J 13/00* | (2006.01) |
| *F16D 1/00* | (2006.01) |
| *F16H 57/02* | (2012.01) |
| *F02B 61/02* | (2006.01) |

(52) U.S. Cl.
CPC . *B62J 13/00* (2013.01); *F02B 61/02* (2013.01)

(58) Field of Classification Search
CPC ......... F16H 7/18; F16H 57/035; F02B 61/02; B62J 13/00; F16P 1/02
USPC ...................................................... 474/144
See application file for complete search history.

(56) References Cited

U.S. PATENT DOCUMENTS

| | | | | |
|---|---|---|---|---|
| 966,391 | A | * | 8/1910 | Fillingham .................... 474/144 |
| 1,087,836 | A | * | 2/1914 | Schoepke ........................ 74/609 |
| 1,089,971 | A | * | 3/1914 | Schoepke ........................ 74/609 |
| 1,261,517 | A | * | 4/1918 | Hadaway ....................... 474/122 |
| 2,210,135 | A | * | 8/1940 | Tauts et al. .................... 474/114 |
| 2,584,788 | A | * | 2/1952 | Cich .............................. 474/144 |
| 4,425,105 | A | * | 1/1984 | Edl et al. ....................... 474/140 |
| 4,869,120 | A | * | 9/1989 | Kashiwai et al. ................. 74/12 |
| 4,908,008 | A | * | 3/1990 | Gorski .......................... 474/146 |
| 5,116,285 | A | * | 5/1992 | Wahl ............................. 474/144 |
| 5,445,568 | A | * | 8/1995 | Fukuzawa et al. ............ 474/144 |
| 5,562,349 | A | * | 10/1996 | Nespodzany et al. ......... 384/493 |
| 5,601,504 | A | * | 2/1997 | Rocca et al. .................... 474/91 |
| 5,791,311 | A | * | 8/1998 | Ozeki ........................ 123/196 R |
| 6,302,817 | B1 | * | 10/2001 | Maute ........................... 474/144 |
| 6,338,688 | B1 | * | 1/2002 | Minami et al. ................ 474/144 |
| 6,398,683 | B1 | * | 6/2002 | Fukuda ......................... 474/144 |

(Continued)

FOREIGN PATENT DOCUMENTS

| | | |
|---|---|---|
| JP | 53122865 U | 9/1978 |
| JP | 1147791 U | 10/1989 |

(Continued)

*Primary Examiner* — Henry Liu

(74) *Attorney, Agent, or Firm* — Alleman Hall McCoy Russell & Tuttle LLP

(57) ABSTRACT

A sprocket cover in a straddle vehicle, which is attached to a side wall of a case of the straddle vehicle to cover a sprocket fastened to an end portion of an output shaft protruding in a vehicle width direction from the case, from outside in the vehicle width direction, comprises an outer cover member attached to the side wall of the case such that the outer cover member is exposed to outside of a vehicle body; and an inner cover member attached to an inner side of the outer cover member to cover the sprocket in a state in which the inner cover member is covered with the outer cover member; wherein the outer cover member and the inner cover member are molded using different resin materials.

16 Claims, 6 Drawing Sheets

(56) References Cited

U.S. PATENT DOCUMENTS

| | | | |
|---|---|---|---|
| 6,544,134 B2 * | 4/2003 | Ohyama et al. | 474/144 |
| 6,598,595 B2 * | 7/2003 | Yasui | 123/572 |
| 6,727,619 B1 * | 4/2004 | Blum | 310/91 |
| 6,808,465 B2 * | 10/2004 | Kuga et al. | 474/14 |
| 6,820,583 B2 * | 11/2004 | Maier | 123/196 R |
| 6,990,932 B2 * | 1/2006 | Kunimitsu et al. | 123/41.33 |
| 7,032,555 B2 * | 4/2006 | Francis | 123/90.6 |
| 7,201,119 B2 * | 4/2007 | Tawarada et al. | 123/41.44 |
| 7,281,596 B2 * | 10/2007 | Fukuda | 180/68.2 |
| 7,303,495 B2 * | 12/2007 | Schoenek et al. | 474/144 |
| 7,357,114 B2 * | 4/2008 | Taki | 123/198 E |
| 7,686,123 B2 * | 3/2010 | Ishida | 180/346 |
| 7,771,303 B2 * | 8/2010 | Fuse et al. | 474/144 |
| 7,951,031 B2 * | 5/2011 | Hioki et al. | 474/140 |
| 8,561,750 B2 * | 10/2013 | Kakimoto et al. | 180/357 |
| 2001/0029215 A1 * | 10/2001 | Ohyama et al. | 474/148 |
| 2004/0259673 A1 * | 12/2004 | Bertrand et al. | 474/144 |
| 2005/0159260 A1 * | 7/2005 | Gogo | 474/111 |
| 2005/0239591 A1 * | 10/2005 | Schoenek et al. | 474/144 |
| 2005/0282670 A1 * | 12/2005 | Kim | 474/144 |
| 2006/0264284 A1 * | 11/2006 | Iwaki | 474/140 |
| 2007/0032324 A1 * | 2/2007 | Uchiyama et al. | 474/140 |
| 2007/0251346 A1 * | 11/2007 | Taki | 74/335 |

FOREIGN PATENT DOCUMENTS

| | | |
|---|---|---|
| JP | 07020136 A | 1/1995 |
| JP | 2008051077 A | 3/2003 |
| JP | 2010159025 A | 7/2010 |

\* cited by examiner

SPROCKET COVER IN STRADDLE VEHICLE

CROSS-REFERENCE TO RELATED APPLICATIONS

This application claims priority to and the benefit of Japanese Patent Application No. 2012-134611 filed Jun. 14, 2012, the entire disclosure of which is incorporated herein by reference.

BACKGROUND OF THE INVENTION

1. Field of the Invention

The present invention relates to a sprocket cover for covering a sprocket used to rotate a drive wheel.

2. Description of the Related Art

In a straddle vehicle such as a motorcycle, a chain is used in a mechanism for transmitting a rotation to a drive wheel. In this case, an output shaft of a driving source or a transmission protrudes laterally from a case, and a sprocket is mounted to an end portion of the output shaft. Japanese Utility Model Application Publication No. Hei. 1-147791 discloses a sprocket cover attached to a side wall of a case so as to cover a sprocket, for the purpose of protecting the sprocket and suppressing a noise from being emitted from the sprocket and the chain.

In general, the sprocket cover is manufactured using metal. However, the sprocket cover manufactured using metal increases its weight and manufacturing cost. Accordingly, the sprocket cover may possibly be manufactured using a resin. Thus, the weight of the sprocket cover can be reduced, but selection flexibility of a material and shape of the sprocket cover is reduced if an attempt is made to attain a plurality design goals (e.g., achievement of a higher mounting stiffness, improvement of its external appearance, prevention of emission of a noise) which are required for the sprocket cover.

SUMMARY OF THE INVENTION

The present invention addresses the above described conditions, and an object of the present invention is to provide a sprocket cover in a straddle vehicle which can attain plural design goals.

A sprocket cover in a straddle vehicle of the present invention, which is attached to a side wall of a case of the straddle vehicle to cover a sprocket fastened to an end portion of an output shaft protruding in a vehicle width direction from the case, from outside in the vehicle width direction, comprises an outer cover member attached to the side wall of the case such that the outer cover member is exposed to outside of a vehicle body; and an inner cover member attached to an inner side of the outer cover member to cover the sprocket in a state in which the inner cover member is covered with the outer cover member; wherein the outer cover member and the inner cover member are molded using different resin materials.

In accordance with this configuration, the outer cover member and the inner cover member are manufactured by molding using resin materials. Therefore, as compared to a case where the sprocket cover is made of metal, a weight of the sprocket cover can be reduced. The outer cover member and the inner cover member are manufactured by molding using different resin materials. Because of this, the outer cover member and the inner cover member are able to perform different functions. As a result, it becomes possible to provide the sprocket cover which can attain plural design goals. Since the outer cover member with the inner cover member mounted thereto is detachably attached to the case, maintenance for the sprocket cover can be carried more easily as compared to a case where the inner cover member and the outer cover member are attached individually to the case.

The above and further objects, features and advantages of the present invention will more fully be apparent from the following detailed description of preferred embodiments with accompanying drawings.

DETAILED DESCRIPTION OF THE PREFERRED EMBODIMENTS

Figure 1:
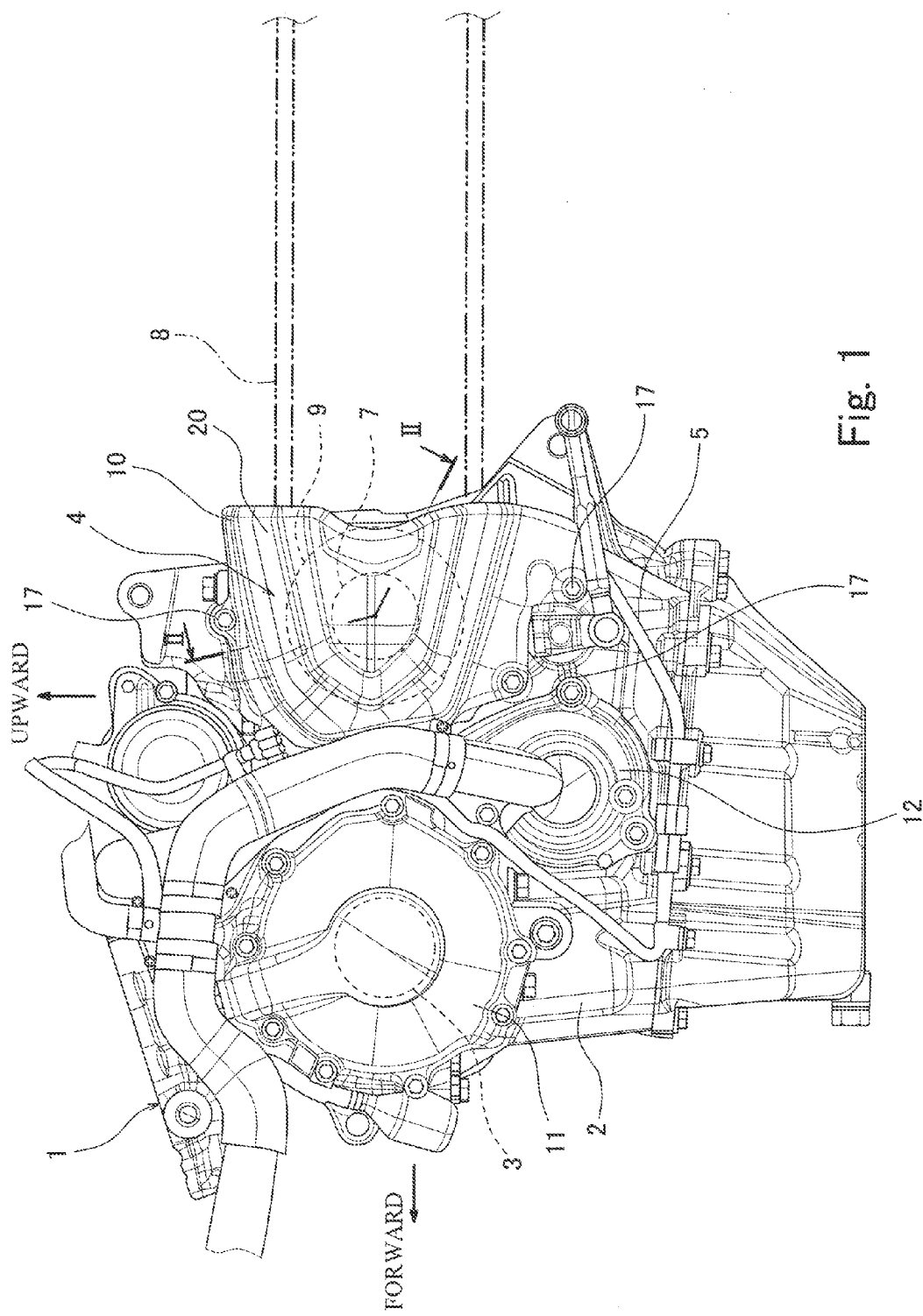
FIG. 1 is a side view of a straddle vehicle according to an embodiment of the present invention, a part of which is viewed from left.

Hereinafter, an embodiment of the present invention will be described with reference to the drawings. Throughout the drawings, the same or corresponding components are identified by the same reference numerals and will not be described in repetition. The stated directions are referenced from the perspective of a driver riding in the straddle vehicle unless otherwise explicitly noted. A vehicle width direction corresponds to a rightward and leftward direction, an outside in the vehicle width direction is a side which is away from a center line of a vehicle body in the rightward and leftward direction, and a center side in the vehicle width direction is a side closer to the center line of the vehicle body.

FIG. 1 is a side view of a straddle vehicle according to an embodiment of the present invention, a part of which is viewed from left. Referring to FIG. 1, a straddle vehicle such as a motorcycle, an automated three-wheeled vehicle, or an ATV (all terrain vehicle) includes, for example, an engine 1 as a driving source. As shown in FIG. 1, the engine 1 includes a case 2 for accommodating a transmission 4 together with a crankshaft (engine output shaft) 3. A rear portion of the case 2 constitutes a transmission case 5 for accommodating the transmission 4. The transmission 4 includes a transmission input shaft (not shown) to which a rotation of the crankshaft 3 is transmitted, and a transmission output shaft 7 to which a rotation of the input shaft is transmitted. The output shaft 7 is disposed in parallel with the crankshaft 3 such that the output shaft 7 is oriented in the rightward and leftward direction. A rotation of the output shaft 7 is transmitted to a rear wheel (not shown) as a drive wheel, via the chain 8.

Figure 2:
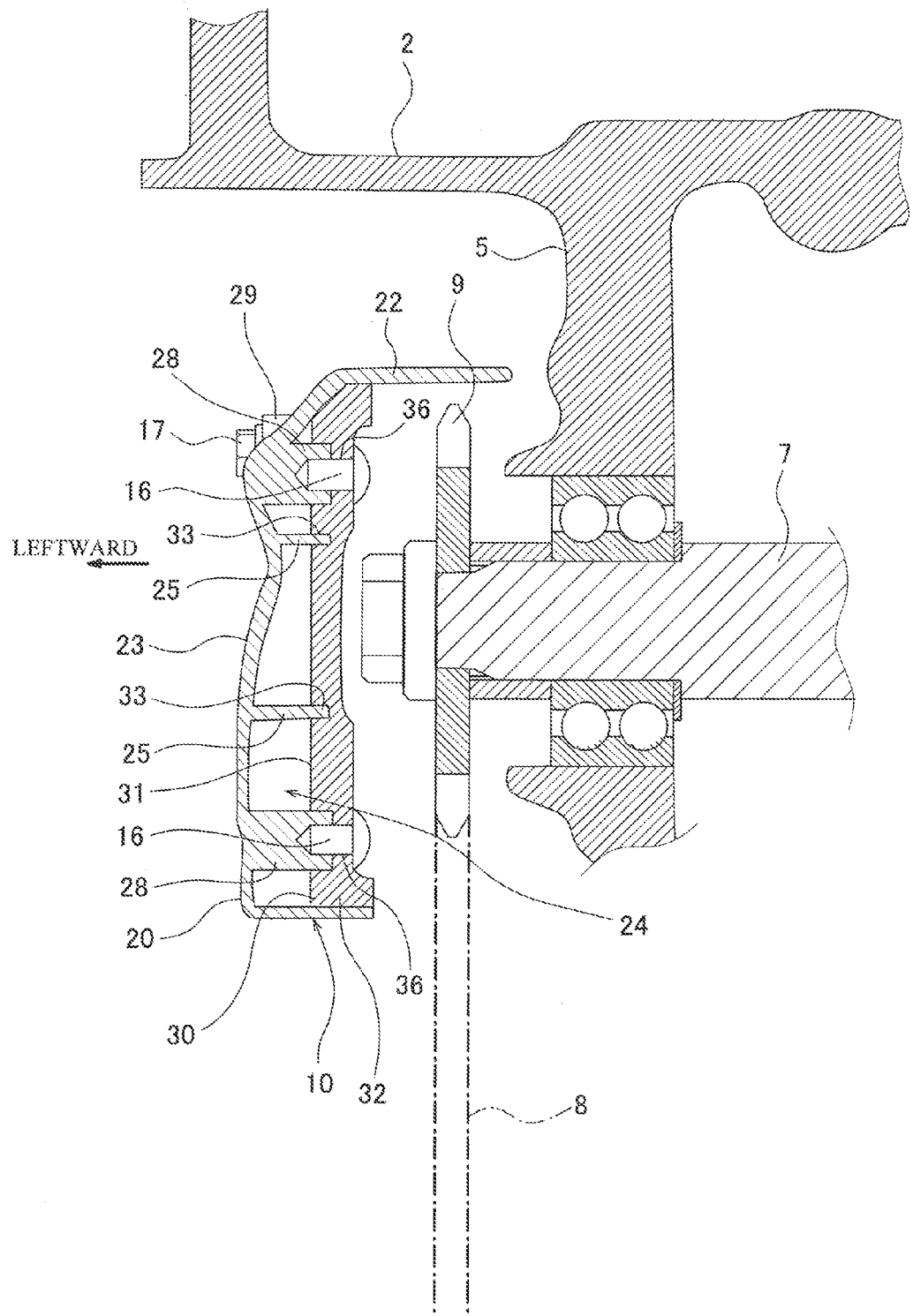
FIG. 2 is a cross-sectional view of a case which is taken along line II-II of FIG. 1.

FIG. 2 is a cross-sectional view of the case 2 which is taken along line II-II of FIG. 1. As shown in FIG. 2, an end portion (e.g., left end portion) of the output shaft 7 protrudes from the case 2 in the vehicle width direction (e.g., leftward), and a sprocket 9 is fastened to the end portion of the output shaft 7. The sprocket 9 is disposed outside (e.g., left side) of the case 2 in a state in which its axis is oriented in the rightward and leftward direction. The chain 8 is wrapped around the sprocket 9. The straddle vehicle includes a sprocket cover 10 covering the sprocket 9 from outside (e.g., left side) in the vehicle width direction. The sprocket cover 10 may be detachably attachable to a side wall (e.g., left side wall) of the case 2. Alternatively, the sprocket 9 may be disposed at a right side of the case 2. In this case, a right end portion of the output shaft 7 protrudes rightward from a right side wall of the case 2, and the sprocket cover 10 is attached to the right side wall of the case 2 to cover the sprocket 9 from a right side.

As shown in FIG. 1, a generator cover 11 and a pump cover 12 are attached to the left side wall of the case 2. The generator cover 11 covers a generator (not shown) fastened to the left end portion of the crankshaft 3 from a left side. The pump cover 12 covers a water pump (not shown) disposed below and rearward relative to the crankshaft 3, from a left side. The sprocket cover 10 is disposed rearward relative to the generator cover 11 and above and rearward relative to the pump cover 12. The generator cover 11 and the pump cover 12 are attached to the left side wall of the case 2 such that they do not overlap with each other when viewed from a side.

As shown in FIG. 2, the sprocket cover 10 includes an outer cover member 20 attached to the side wall (e.g., left side wall) of the case 2 and an inner cover member 30 attached to an inner side of the outer cover member 20. As described above, the sprocket cover 10 does not overlap with another case attached to the side wall of the case 2 when viewed from the side. An outer surface of the outer cover member 20 is exposed to outside of the vehicle body. The inner cover member 30 is covered with the outer cover member 20 from outside (e.g., left side) in the vehicle width direction, and covers the sprocket 9 from outside (e.g., left side) in the vehicle width direction. By attaching and detaching the outer cover 20 to and from the case 2, the inner cover member 30 is attached to and detached from the case 2 together with the outer cover member 20. A conventional sprocket cover is manufactured using a single material and is constructed as a single component. On the other hand, the sprocket cover 10 of the present embodiment includes the inner cover member 30 and the outer cover member 20 which are manufactured by molding using different resin materials, respectively and assembled into one unit.

Figure 6:
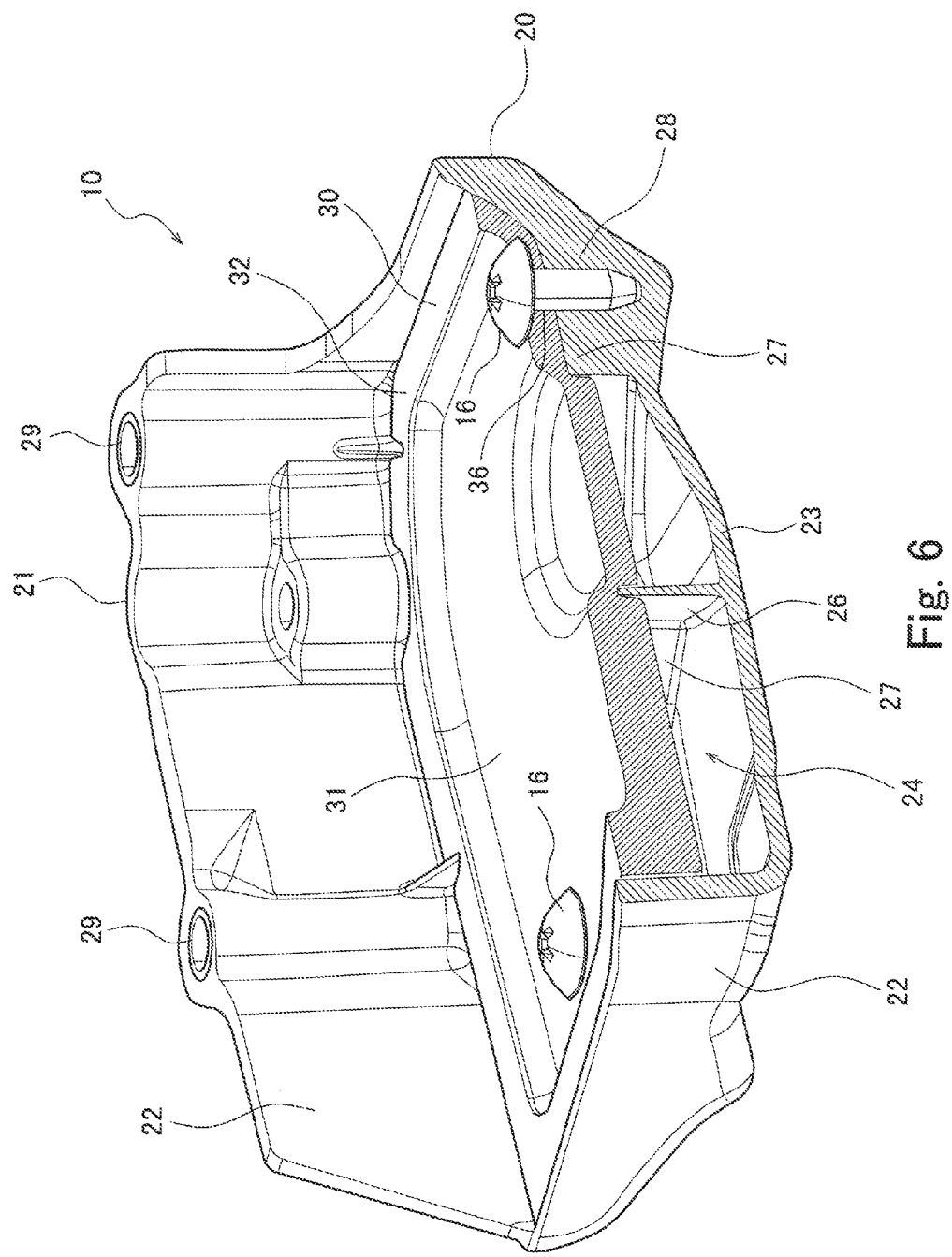
FIG. 6 is a perspective cross-sectional view of the sprocket cover, which is taken along line VI-VI of FIG. 5.

The outer cover member 20 has a smaller thickness than the inner cover member 30 (see FIG. 6 in addition to FIG. 2). Because of this, surface roughness (e.g., sink marks) does not substantially appear on the outer cover member 20 manufactured by molding the resin material. Since the inner cover member 30 is covered with the outer cover member 20, the thickness of the inner cover member 30 can be increased according to a desired strength and a desired noise-proof property without considering an external appearance. Since the inner and outer cover members 30 and 20 manufactured by molding the different resin materials are assembled into one unit, they are allowed to perform different functions. For example, the outer cover member 20 exposed outside of the vehicle can improve an external appearance, while the inner cover member 30 covered with the outer cover member 20 can improve a strength of the sprocket cover 10 and emit a noise.

The outer cover member 20 is made of a material having a higher stiffness than a material of the inner cover member 30. Because of this, the stiffness of the outer cover member 20 attached to the case 2 can be increased, and a stiffness with which the outer cover member 20 is attached to the case 2 can be increased. Although the outer cover member 20 is thinned for improvement of external appearance of the sprocket cover 10, a high strength or high stiffness of the outer cover member 20 can be maintained, by using a high stiffness material.

The outer cover member 20 is made of a resin material filled with reinforced fibers (fiber-reinforced resin material) such as GFRP (glass fiber reinforced plastic) or CFRP (carbon fiber reinforced plastic). As a material of the outer cover member 20, for example, PA6-GF30 (resin material composed of polyamide 6 containing 30% of glass fibers), is suitably used. As a material of the inner cover member 30, a resin material which is not filled with reinforced fibers (non-fiber-reinforced resin material) is used. Thus, the stiffness of the outer cover member 30 and the stiffness of the inner cover member 30 can be made different easily. In addition, the strength and stiffness of the outer cover member 20 can be increased while thinning the outer cover member 20. In general, the fiber-reinforced resin material is more expensive than the non-fiber-reinforced resin material having a lower stiffness than the fiber-reinforced resin material. By using the fiber-reinforced resin material for the outer cover member 20 which is made thinner than the inner cover member 30, an amount of usage of the expensive material can be reduced, and manufacturing cost of the sprocket cover 10 does not increase.

By assembling the inner and outer cover members 30 and 20 manufactured by molding the different resin materials, the plural design goals can be attained more easily and the sprocket cover which can attain these goals can be manufactured inexpensively, than a case where the sprocket cover is manufactured using a single material and a single component. In addition, optimal materials can be selected for the inner and outer cover members 30 and 20, respectively, to enable them to perform their functions. Thus, the materials are selected for the inner and outer sections 30 and 20 more flexibly.

Since the sprocket cover 10 is constructed as the assembly unit, the outer cover member 30 attached with the inner cover member 20 can be detachably attached to the case 2. This allows maintenance for the sprocket 9 and the chain 8 to be carried out more easily as compared to a case where an inner cover member and an outer cover member are separately detachably attached to a case. Since the sprocket cover 10 can be detachably attached without relation to the generator cover 11 and the pump cover 12, maintenance of the sprocket 9 and the chain 8 can be carried out easily.

The resin materials used to manufacture the inner cover member 30 and the outer cover member 20 are preferably resin materials used for molding and non-foam materials. To effectively absorb a sound, a foam material such as urethane may be used. In that case, also, preferably, the inner cover member 30 and the outer cover member 20 may be manufactured by molding the resin materials, and a sheet made of a foam material is bonded to an inner surface or an outer surface of the inner cover member 30 or to an inner surface of the outer cover member 20. By using the molding resin materials for the inner cover member 30 and the outer cover member 20 which are major constituents of the sprocket cover 10, the shape of the inner cover member 30 and the shape of the outer cover member 20 can be maintained more easily, degradation of the sprocket cover 10 which progresses over time can be lessened, and the strength of the sprocket cover 10 can be improved, as compared to a case where the inner cover member 30 and the outer cover member 20 are formed of foam materials.

Figure 3:
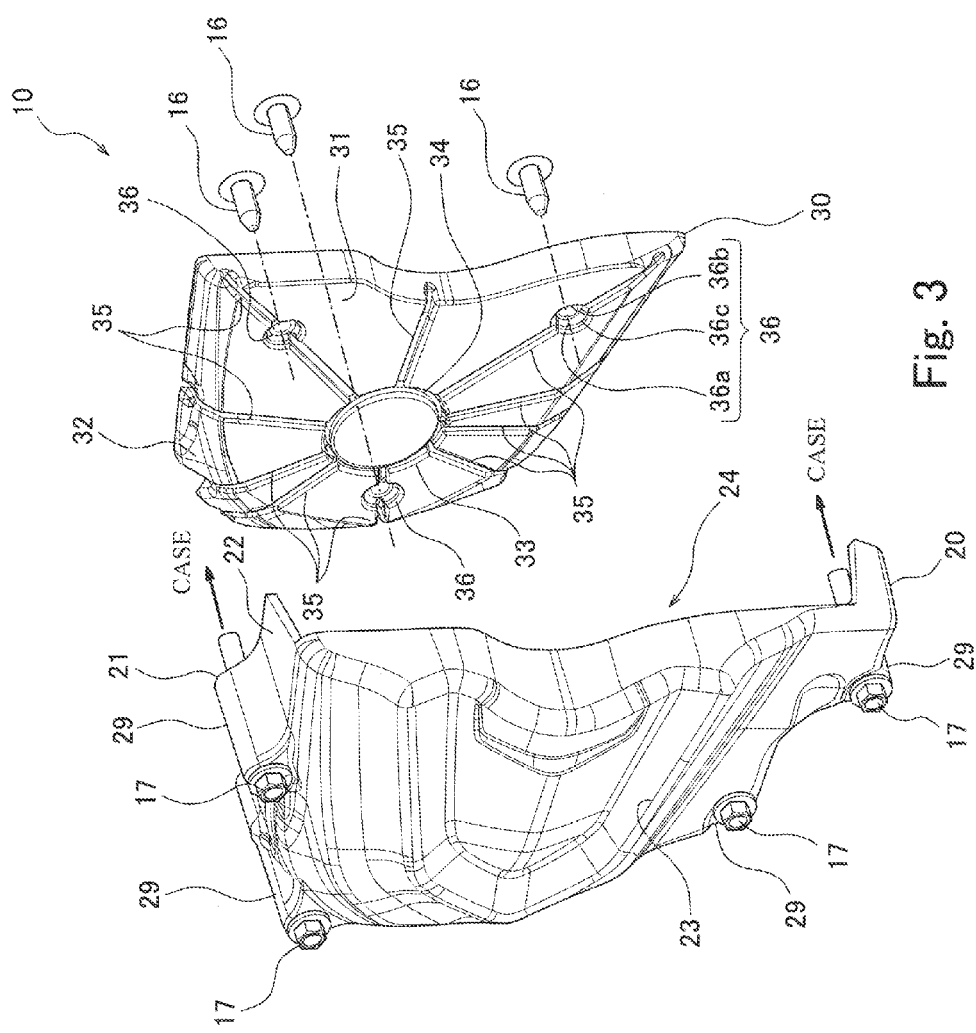
FIG. 3 is an exploded perspective view of the sprocket cover of FIG. 1, when viewed from left, from above and from rear.
Figure 4:
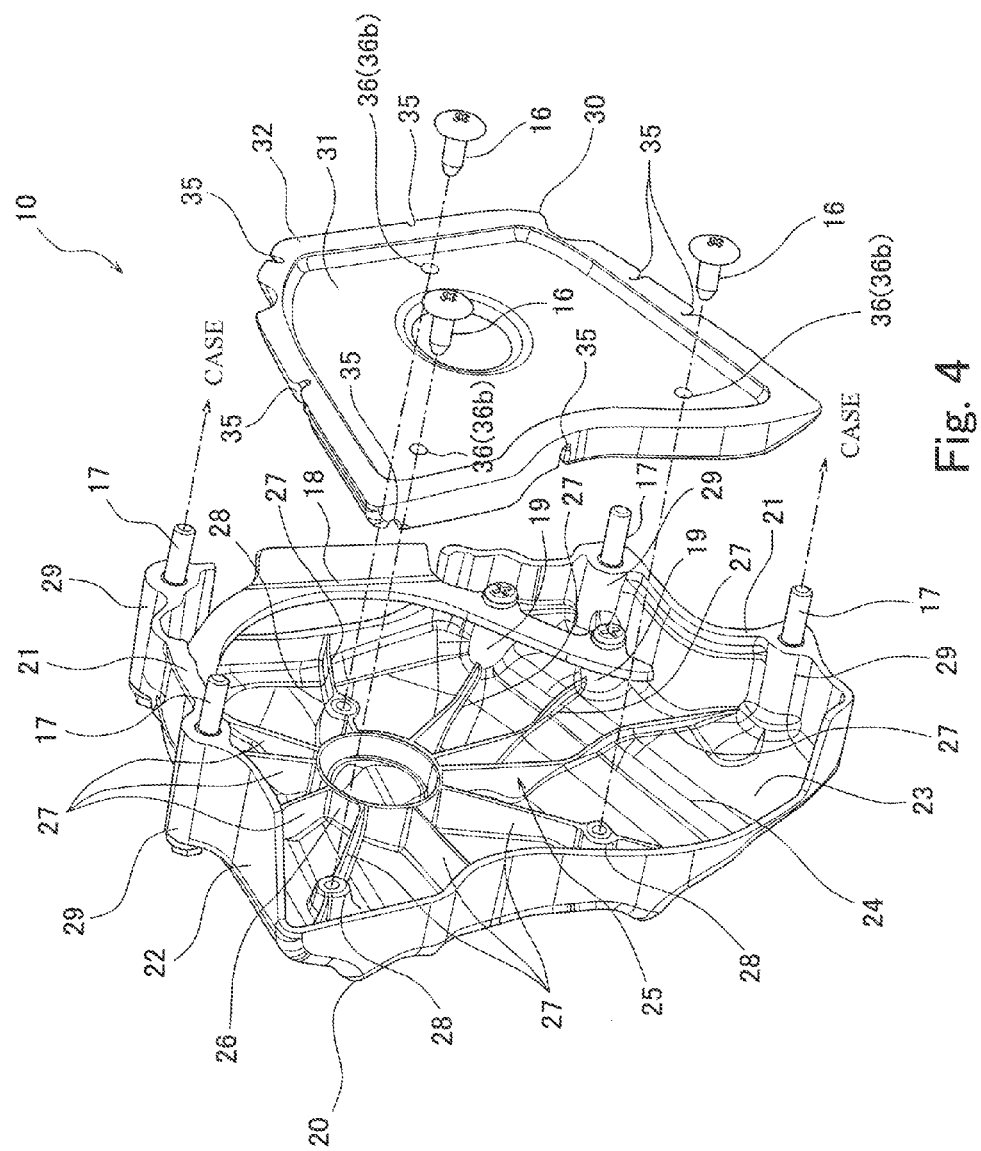
FIG. 4 is an exploded perspective view of the sprocket cover of FIG. 1, when viewed from right, from above and from rear.

Hereinafter, further advantages of the sprocket cover 10 according to the present embodiment will be described in conjunction with the structure of the inner cover member 30 and the structure of the outer cover member 20. FIG. 3 is an exploded perspective view of the sprocket cover 10 of FIG. 1, when viewed from left, from above and from rear. FIG. 4 is an exploded perspective view of the sprocket cover 10 of FIG. 1, when viewed from right, from above and from rear.

As shown in FIG. 3, the outer cover member 20 includes a case contact portion 21 which contacts the case 2, a side wall portion 22 extending outside (e.g., left side) in an axial direction (i.e., vehicle width direction) of the sprocket 9 (see FIG. 2) from the case contact portion 21, and a lid portion 23 provided so as to close the side wall portion 22. The lid portion 23 having a great area is provided so as to cover the entire sprocket 9 (see FIG. 2), from outside (e.g., left side) in the vehicle width direction. The side wall portion 22 protrudes from an edge portion of the lid portion 23 toward the case 2. The outer cover member 20 defines an inner space 24 for accommodating the sprocket 9 (see FIG. 2) inside of the lid portion 23 and the side wall portion 22. The inner cover member 30 is accommodated in the inner space 24 and is disposed between an inner surface of the lid portion 23 and the sprocket 9 (see FIG. 2). To allow the chain 8 to extend rearward without interfering with the sprocket cover 10, the side wall portion 22 is not provided in a rear portion of the outer cover member 20.

As shown in FIG. 4, the outer cover member 20 has a rib 25 protruding toward a center (e.g., rightward) in the vehicle width direction from the inner surface of the lid portion 23. The rib 25 includes an annular rib portion 26 provided at a center portion of the outer cover member 20 (to be specific, lid portion 23), and a plurality of radial rib portions 27 extending radially from the annular rib portion 26. The radial rib portions 27 protrude toward a center (rightward) in the vehicle width direction from the inner surface of the lid portion 23 and connects the outer peripheral surface of the annular rib portion 26 to the inner surface of the side wall portion 22. The radial rib portions 27 can improve the strength of the outer cover member 20.

The outer cover member 20 has a plurality of mounting portions 28 protruding toward a center (e.g., rightward) in the vehicle width direction from the inner surface of the lid portion 23. Each mounting portion 28 has a bottomed tube shape in which it is open at a center side (e.g., at a right side) in the vehicle width direction and is closed at an outer side (e.g., at a left side) in the vehicle width direction. The mounting portion 28 has a threaded hole which is a threaded groove formed on its inner peripheral surface. The plurality of mounting portions 28 are positioned outward relative to the annular rib portion 26, and dispersed on the inner surface of the lid portion 23. The plurality of mounting portions 28 are integral with the radial rib portions 27. The plurality of (e.g., three) mounting portions 28 are provided integrally with the plurality of radial rib portions 27 (e.g., three radial rib portions 27 spaced apart from each other at about 120 degrees) which are spaced apart from each other at substantially equal intervals in a circumferential direction of the annular rib portion 26.

The inner cover member 30 includes a lid portion 31 covering the sprocket 9 (see FIG. 2), and an outer peripheral wall portion 32 provided so as to enclose an outer periphery of the lid portion 31. The outer peripheral wall portion 32 protrudes toward a center (e.g., rightward) in the vehicle width direction father than an end surface (e.g., right end surface) of the lid portion 31 at a center side in the axial direction. The end surface (e.g., right side surface) of the lid portion 31 at the center side in the axial direction is recessed axially outward (e.g., leftward) from an end surface (e.g., right side surface) of the outer peripheral wall portion 32 at a center side in the axial direction. The end portion of the output shaft 7 is disposed in this recess, thereby reducing an amount of a protruding portion of the sprocket cover 10 protruding outward in the vehicle width direction while avoiding interference between the sprocket cover 10 and the output shaft 7.

As shown in FIG. 3, the inner cover member 30 has engagement grooves 33 formed on an end surface (e.g., left side surface) of the lid portion 31, which end surface is located outward in its axial direction. The ribs 25 of the outer cover member 20 are engaged into the engagement grooves 33, respectively. The engagement groove 33 include an annular groove portion 34 provided in a center portion of the inner cover member 30 (to be precise, lid portion 31) and radial groove portions 35 extending radially from the annular groove portion 34. The radial groove portions 35 extend continuously to a surface of the outer peripheral wall portion 32. The inner cover member 30 has a plurality of mounting holes 36 penetrating the lid portion 31. Each of the mounting holes 36 has a larger-diameter portion 36a which is located outward in the axial direction and a smaller-diameter portion 36b which is located at a center side in the axial direction. The larger-diameter portion 36a has a greater inner diameter than the smaller-diameter portion 36b. A ring-shaped stepped portion 36c is formed between the larger-diameter portion 36a and the smaller-diameter portion 36b. The plurality of mounting holes 36 are provided at intermediate portions of the radial groove portions 35.

When the inner cover member 30 is attached to the outer cover member 20, the inner cover member 30 is accommodated into the inner space 24 of the outer cover member 20, and the ribs 25 (see FIG. 3) are engaged into the engagement grooves 33 (see FIG. 4), respectively. The annular rib portion 26 is fitted into the annular groove portion 34, and all of the radial rib portions 27 are fitted into the corresponding radial groove portions 35, respectively. The mounting portions 28 of the outer cover member 20 are fitted into the larger-diameter portions 36b of the mounting holes 36, and contact the stepped portions 36c, respectively. This allows the threaded holes of the mounting portions 28 to conform to the smaller-diameter portions 36b of the mounting holes 36, respectively. Then, a plurality of bolts 16 are inserted into the corresponding smaller-diameter portions 36b, respectively, from a center side (e.g., right side) in the vehicle width direction, and threadingly engaged into the threaded holes of the mounting portions 28, respectively.

As shown in FIG. 4, a chain guide 18 which is made of metal is fastened to a rear portion of the inner surface of the outer cover member 20 by bolts. The outer cover member 20 has bosses 19 protruding from the inner surface thereof to mount the chain guide 18. The bosses 19 are provided at tip end portions of the radial rib portions 27 extending substantially rearward, respectively. Therefore, the chain guide 18 can be mounted to the outer cover member 20 after the inner cover member 30 is mounted to the outer cover member 20.

Figure 5:
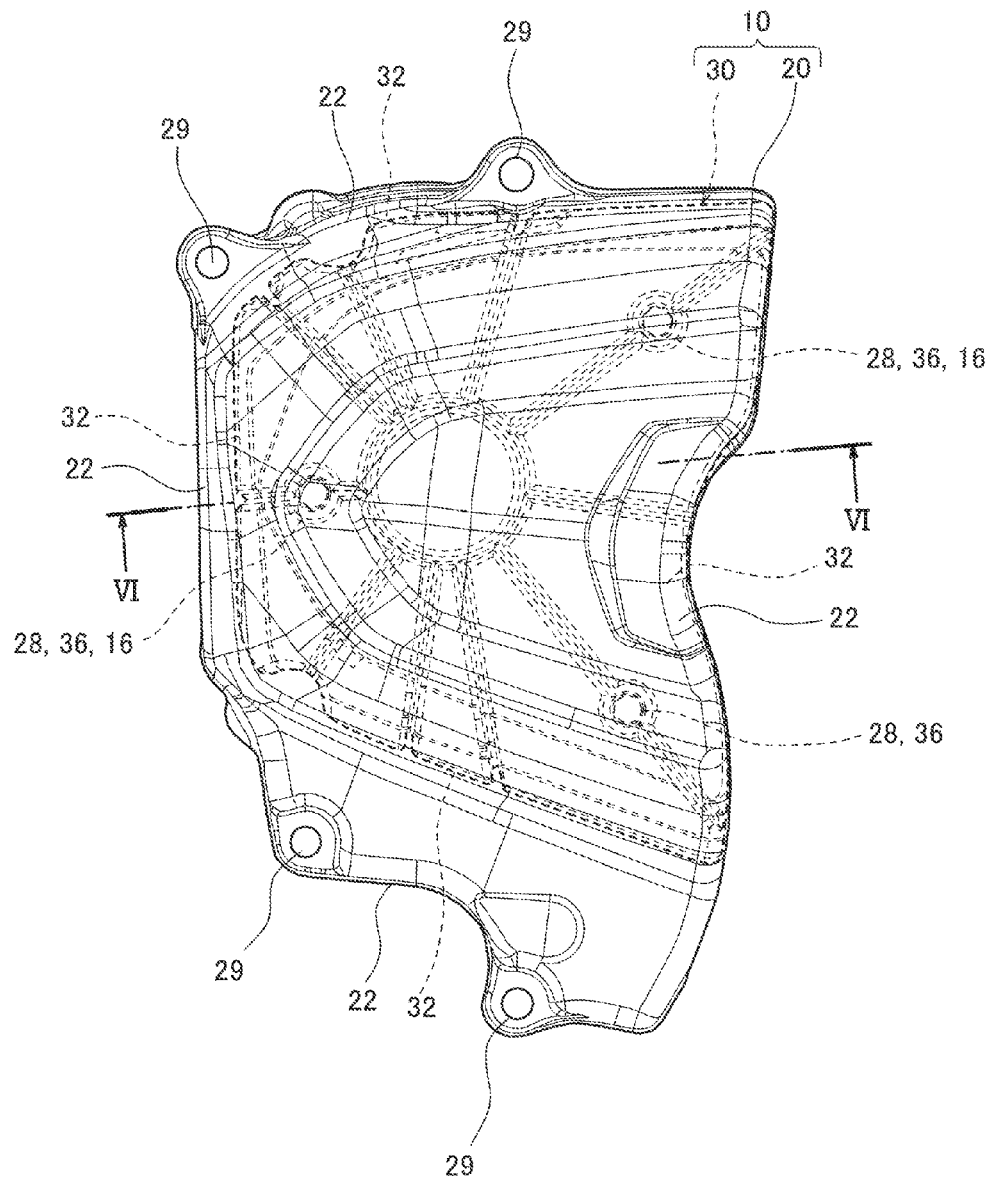
FIG. 5 is a left side view of the sprocket cover of FIG. 1.

FIG. 5 is a left side view of the sprocket cover 10 as the assembly unit. In FIG. 5, the inner cover member 30 covered with the outer cover member 20 is represented by a broken line. FIG. 6 is a perspective cross-sectional view of the sprocket cover 10, which is taken along line VI-VI of FIG. 5. As shown in FIG. 5, the mounting portions 28 are arranged in a deconcentrating manner on the inner surface of the lid portion 31. With this arrangement, the inner cover member 30 can be firmly mounted to the outer cover member 20.

As shown in FIGS. 5 and 6, the mounting portions 28 are not open outward (e.g., leftward) in the vehicle width direction. For this reason, in the assembly unit of the sprocket cover 10, the bolts 16 are not exposed outside of the lid portion 23. Thus, in the sprocket cover 10 as the assembly unit of the inner cover member 30 and the outer cover member 20, the external appearance of the sprocket cover 10 is not impaired by the mounting members (bolts 16) for fastening the two cover members 30 and 20 together.

By engagement between the ribs 25 and the engagement grooves 33, the inner cover member 30 can be positioned with respect to the outer cover member 20. Since the ribs 25 for improving the strength of the outer cover member 20 are fitted into the engagement grooves 33, respectively, the lid portion 31 of the inner cover member 30 can be made closer in its axial direction to the lid portion 23 of the outer cover member 20. Therefore, a size of the entire sprocket cover 10 in the vehicle width direction does not increase.

A substantially entire portion of the outer peripheral wall portion 32 of the inner cover member 30, except for its lower portion, is closely attached to the inner surface of the side wall portion 22 of the outer cover member 20. This allows an entire peripheral wall (side wall portion 22 enclosing the lid portion 23 and the outer peripheral wall portion 32 enclosing the lid portion 31) of the sprocket cover 10 to have a greater thickness, which improves the strength of the sprocket cover 10. Although in the present embodiment, the thickness of the outer cover member 30 is set smaller for the purpose of improvement of the external appearance, the side wall portion 22 and the outer peripheral wall portion 32 can attain a higher strength together because the side wall portion 22 is closely attached to the outer peripheral wall portion 32 having a greater thickness.

Since the outer peripheral wall portion 32 of the inner cover member 30 is closely attached to the inner surface of the side wall portion 22, the inner cover member 30 is accommodated into the inner space 24 defined by the case contact portion 21, the side wall portion 22 and the lid portion 23, together with the sprocket 9, and the inner cover member 30 overlaps with the outer cover member 20 in the vehicle width direction. The sprocket 9 is covered with the inner cover member 30 and further with the outer cover member 20. When the sprocket cover 10 as the assembly unit of the inner cover member 30 and the outer cover member 20 is viewed as a whole, the cover (inner cover member 30) located outside of the sprocket 9 has a greater thickness. Therefore, the strength and noise-proof property of the sprocket cover 10 can be improved as a whole.

The outer cover member 20 is in contact with portions of the surface of the inner cover member 30, which portions are different from the mounting portions 28. The portions include the surfaces of the ribs 25, the inner surface of the side wall portion 22, etc. In the sprocket cover 10 of the present embodiment, a portion of the inner surface of the outer cover member 20 and a portion of the surface of the inner cover member 30 which portions are in contact with each other are great in area. This makes it possible to suppress a vibration noise from being emitted from the outer cover member 20, in the configuration in which the lid portion 31 of the inner cover member 30 is spaced apart from the lid portion 23 of the outer cover member 20 in the axial direction and the thickness of the outer cover member 20 is made smaller. That is, since the portion of the outer cover member 20 and the portion of the inner cover member 30, which portions are in contact with each other, can be ensured, it becomes possible to avoid the lid portion 23 of the outer cover member 20 from becoming a vibrating plate which generates a vibrating noise. Especially, in the present embodiment, the ribs 25 have the center annular rib portion 26 and the radial rib portions 27 extending radially from the annular rib portion 26. Because of this structure, the portions of the lid portion 23 of the outer cover member 20 which are not in contact with the inner cover member 30 are dispersed in the circumferential direction. Therefore, even when the lid portion 23 is increased in size and the outer cover member 20 having a great area covers the entire of the sprocket 9 (see FIG. 2), the vibrating noise emitted from the outer cover member 20 can be suitably suppressed.

There is a gap between the inner surface of the lid portion 23 of the outer cover member 20 and the outer surface of the lid portion 31 of the inner cover member 30. This gap makes it possible to reduce a size and weight of the inner cover member 30 while maintaining a noise-proof property.

As shown in FIGS. 3 and 4, the outer cover member 20 has a plurality of case mounting portions 29 provided on the side wall portion 22. The case mounting portions 29 have through-holes extending axially, respectively. The through-holes open in the case contact portion 21 at a center side (e.g., right side) in the axial direction. The sprocket cover 10 as the assembly unit is disposed outside of the case 2 (see FIG. 1) in the vehicle width direction such that the sprocket cover 10 covers the sprocket 9 (see FIG. 1) from outside in the vehicle width direction. Bolts 17 are inserted into the case mounting portions 29, respectively from outside in the vehicle width direction and threadingly engaged with the case 2. Thus, the sprocket cover 10 as the assembly unit is mounted to the case 2. The case mounting portions 29 are located outside relative to the inner cover member 30 when viewed from side, and the sprocket cover 10 is mounted to the case 2 in a location outside of the inner cover member 30. With this structure, in a state in which the inner cover member 30 is mounted to the outer cover member 20, the outer cover member 20 can be detachably attached to the case 2 irrelevantly of the inner cover member 30.

Although the present embodiment has been described above, the above described structure may be changed, added or deleted without departing from a spirit of the present invention. For example, the inner cover member 30 may be in contact with the outer cover member 20 in portions other than the ribs 25 and the outer peripheral wall portion 32. For example, the lid portion of the inner cover member may be configured to have a thickness greater than a depth of the engagement grooves, and the outer end surface (e.g., left side surface) of the lid portion in the axial direction may be in surface contact with the inner surface of the lid portion of the outer cover member. Or, the inner cover member may have a protruding portion protruding from outward (e.g., leftward) from the lid portion and this protruding portion may be in contact with the inner surface of the lid portion of the outer cover member. In this case, the protruding portion may be disposed on an inner periphery or an outer periphery of the annular groove portion.

The mounting members 16 by which the inner cover member 30 is mounted to the outer cover member 20 are not limited to the bolts but may be, for example, rivets. Or, the inner cover member 30 may be mounted to the outer cover member 20 without using dedicated mounting members. For example, the inner cover member 30 may be mounted to the outer cover member 20 in such a manner that a hook provided on one of the inner cover member 30 and the outer cover member 20 may be engaged into a groove provided on the other of the inner cover member 30 and the outer cover member 20.

Although in the above embodiment, the output shaft fastened with the sprocket is the output shaft of the transmission, it may be an output shaft of a driving source in a straddle vehicle which does not incorporate a transmission. As the driving source, an electric motor may be used instead of or in addition to an engine (internal combustion engine). Therefore, the output shaft is not limited to that protruding from the transmission case, but may protrude from a case member accommodating the crankshaft of the engine, or protrude from a case member accommodating the electric motor.

The present invention has advantages that it is possible to provide a sprocket cover which can attain plural design goals such as improvement of a mounting stiffness, improvement of its external appearance, and prevention of noise emission to outside, and is advantageously applied to a straddle vehicle including a sprocket disposed outside of a case.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A sprocket cover in a straddle vehicle, which is attached to a side wall of a case of the straddle vehicle to cover a sprocket fastened to an end portion of an output shaft protruding in a vehicle width direction from the case, from outside in the vehicle width direction, the sprocket cover comprising:
   an outer cover member attached to the side wall of the case such that the outer cover member is exposed to outside of a vehicle body; and
   an inner cover member attached to an inner side of the outer cover member to cover the sprocket in a state in which the inner cover member is covered with the outer cover member;
   wherein the outer cover member includes an outer lid portion for covering the sprocket from outside in the vehicle width direction, a side wall portion protruding from the outer lid portion toward the case, and a rib provided on an inner surface of the outer lid portion;
   wherein the inner cover member includes an inner lid portion covering the sprocket from outside in the vehicle width direction, and an engagement groove which is formed on an outer surface of the inner lid portion and engaged with the rib of the outer cover member;
   wherein the rib includes an annular rib portion provided at a center portion of the inner surface of the outer lid portion, and a plurality of radial rib portions which are provided on the inner surface and extend radially from the annular rib portion; and
   wherein the engagement groove includes an annular groove portion which is provided at a center portion of the outer surface of the inner lid portion and is engaged with the annular rib portion, and a plurality of radial groove portions which are provided on the outer surface of the inner lid portion, extend radially from the annular groove portion, and are engaged with the radial rib portions, respectively.

2. The sprocket cover in the straddle vehicle according to claim 1,
   wherein the outer cover member is formed of a material having a higher stiffness than a material of the inner cover member.

3. The sprocket cover in the straddle vehicle according to claim 2,
   wherein the outer cover member is molded using a fiber-reinforced resin material, and the inner cover member is molded using a non-fiber-reinforced resin material.

4. The sprocket cover in the straddle vehicle according to claim 1,
   wherein the outer lid portion and the side wall portion define an inner space for accommodating the sprocket; and
   wherein the inner cover member is disposed between an inner surface of the outer lid portion and the sprocket.

5. The sprocket cover in the straddle vehicle according to claim 1,
   wherein the inner surface of the outer lid portion is in contact with the outer surface of the inner lid portion in an area different from a mounting portion by which the outer lid portion is mounted to the inner lid portion.

6. The sprocket cover in the straddle vehicle according to claim 1,
   wherein the outer cover member has a mounting portion protruding from the inner surface thereof, and the inner cover member is mounted to the mounting portion by using a mounting tool inserted into the mounting portion from inside in the vehicle width direction, in a state in which the inner cover member is in contact with the mounting portion.

7. The sprocket cover in the straddle vehicle according to claim 1,
   wherein the thickness of the outer cover member in an axial direction of the output shaft is smaller than the thickness of the inner cover member in the axial direction.

8. The sprocket cover in the straddle vehicle according to claim 1,
   wherein the thickness of the outer cover member is smaller than the thickness of the inner cover member in a location which is outward relative to the sprocket in an axial direction of the output shaft.

9. The sprocket cover in the straddle vehicle according to claim 1,
   wherein the outer lid portion of the outer cover member has a smaller thickness than the inner lid portion of the inner cover member.

10. The sprocket cover in the straddle vehicle according to claim 1,
    wherein the inner cover member is spaced apart from a chain wrapped around the sprocket.

11. The sprocket cover in the straddle vehicle according to claim 1,
    wherein a gap is formed between the inner surface of the outer lid portion and the outer surface of the inner lid portion.

12. A sprocket cover in a straddle vehicle, which is attached to a side wall of a case of the straddle vehicle to cover a sprocket fastened to an end portion of an output shaft protruding in a vehicle width direction from the case, from outside in the vehicle width direction, the sprocket cover comprising:
    an outer cover member attached to the side wall of the case such that the outer cover member is exposed to outside of a vehicle body; and
    an inner cover member attached to an inner side of the outer cover member to cover the sprocket in a state in which the inner cover member is covered with the outer cover member;
    wherein the outer cover member and the inner cover member are formed using different resin materials; and
    wherein a thickness of the outer cover member in an axial direction of the output shaft is smaller than a thickness of the inner cover member in the axial direction.

13. The sprocket cover in the straddle vehicle according to claim 12,
    wherein the thickness of the outer cover member is smaller than the thickness of the inner cover member, in a location which is outward relative to the sprocket in the axial direction of the output shaft.

14. The sprocket cover in the straddle vehicle according to claim 12, wherein the outer cover member includes a portion facing the sprocket in the axial direction and a rib portion protruding in the axial direction from the portion facing the sprocket toward the sprocket, and wherein a thickness of the portion facing the sprocket in the axial direction is smaller than a thickness of the inner cover member in the axial direction.

15. The sprocket cover in the straddle vehicle according to claim 12, wherein the inner cover member has a surface facing the outer cover member in the axial direction, and the surface of the inner cover member is provided with an engagement groove recessed in the axial direction and engaged with the rib portion.

16. The sprocket cover in the straddle vehicle according to claim 12, wherein each of the inner cover member and the outer cover member covers the output shaft and the sprocket from outward in the axial direction.

* * * * *